(12) United States Patent
Kiyono et al.

(10) Patent No.: US 7,155,038 B2
(45) Date of Patent: Dec. 26, 2006

(54) HANDWRITING IDENTIFICATION SYSTEM, WRITING IMPLEMENT FOR IDENTIFYING HANDWRITING AND METHOD FOR IDENTIFYING HANDWRITING

(75) Inventors: Satoshi Kiyono, Sendai (JP); Shunji Mori, Aizuwakamatsu (JP); Sadao Omata, Koriyama (JP)

(73) Assignee: Axiom Co., Ltd., Koriyama (JP)

( * ) Notice: Subject to any disclaimer, the term of this patent is extended or adjusted under 35 U.S.C. 154(b) by 881 days.

(21) Appl. No.: 09/794,126

(22) Filed: Feb. 28, 2001

(65) Prior Publication Data

US 2001/0021262 A1    Sep. 13, 2001

(30) Foreign Application Priority Data

Mar. 3, 2000    (JP) .............................. 2000-059526

(51) Int. Cl.
*G06K 9/00* (2006.01)

(52) U.S. Cl. ...................... 382/122; 73/54.24; 73/702

(58) Field of Classification Search ................ 382/115, 382/225, 119, 188, 120, 313, 121, 122, 123; 73/54.25, 54.24, 573, 688, 514.29, 579, 78, 73/702, 865.4; 178/18, 19, 20; 348/161
See application file for complete search history.

(56) References Cited

U.S. PATENT DOCUMENTS

| | | | | |
|---|---|---|---|---|
| 3,906,444 A | * | 9/1975 | Crane et al. ................. | 382/122 |
| 5,054,088 A | * | 10/1991 | Gunderson et al. ......... | 382/120 |
| 5,077,802 A | * | 12/1991 | Plamondon .................. | 382/122 |
| 5,422,959 A | * | 6/1995 | Lee ............................. | 382/119 |
| 5,726,686 A | * | 3/1998 | Taniishi et al. ............. | 345/179 |
| 5,766,137 A | | 6/1998 | Omata | |
| 6,157,731 A | * | 12/2000 | Hu et al. ..................... | 382/119 |
| 6,332,040 B1 | * | 12/2001 | Jones ........................... | 382/197 |
| 6,633,282 B1 | * | 10/2003 | Monroe ........................ | 345/179 |

\* cited by examiner

*Primary Examiner*—Sheela Chawan
(74) *Attorney, Agent, or Firm*—Oliff & Berridge, PLC

(57) ABSTRACT

A processing terminal 10 includes a writing implement (ball point pen) 30. The writing implement 30 is provided with a tilt change detecting mechanism for detecting a change in a tilt with respect to a writing implement main body of a lead and a vibration detecting mechanism for detecting the change in the vibration of the vibrated lead at the time of handwriting. The processing terminal 10 produces handwriting motion information based on both of the detected changes in the tilt of the lead and in the vibration. A handwriting identification organization 20 compares handwriting motion information with inherent information stored previously to identify handwriting. Thereby it can achieve high reliability in an authentication system with a simple structure.

13 Claims, 16 Drawing Sheets

$$\theta_x = [(V_1 + V_4) - (V_2 + V_3)] / S_x$$
$$\theta_y = [(V_1 + V_2) - (V_3 + V_4)] / S_y$$

HANDWRITING IDENTIFICATION SYSTEM, WRITING IMPLEMENT FOR IDENTIFYING HANDWRITING AND METHOD FOR IDENTIFYING HANDWRITING

BACKGROUND OF THE INVENTION

1. Filed of the Invention

The present invention relates to a technique for identifying handwriting such as a signature, and more particularly to a technique for executing authentication by identifying the handwriting.

2. Description of the Related Art

A request for improving reliability with respect to the security of a system is increasing more and more. There is a handwriting trace authentication system using the inherence of the handwriting trace as one of the systems for assuring security. This system has been already utilized as not only a system utilizing image processing to perform identification through comparison of an entire fetched image of a signed signature and an entire image of the signature stored previously, but also a system of detecting a writing pressure by a pressure sensitive tablet to take the writing pressure and the handwriting trace as the identifying reference.

However, in the conventional handwriting trace authentication system using image processing, there is a problem of complicating the structure of the device due to the image processing system. Further, it is difficult to identify a handwriting trace that is very similar to an original trace due to imitation, and accordingly, this causes a problem of impairing reliability of the authentication. Moreover, on the other hand, in the pressure sensitive tablet type of device, the place for detecting the handwriting is limited on the pressure sensitive tablet. As a result, it is difficult to locate the narrow space because matching the various types of papers and the writing place enlarges the size of the device.

SUMMARY OF THE INVENTION

In view of the above problems of the related art, the inventors of the present invention have developed a new handwriting identification system. The present invention detects a change in a tilt with respect to a writing implement main body of a lead at the time of handwriting to perform handwriting identification on the basis of this change. As it does not need the exclusive tablet, the structure of the device can be simplified, and the size of the device can be reduced. This can achieve improvement in the reliability of the system because the handwriting identification is executed on the basis of a characteristic, such as the tilt with respect to the writing implement main body of the lead, that can not be imitated by others.

Furthermore, the present invention detects vibration of the vibrated lead at the tome of handwriting to identify the handwriting on the basis of change in the detected vibration. Thereby, other people's imitation becomes more difficult, and accordingly it can achieve an improvement in the reliability to the system.

Further, the present invention executes the handwriting identification according to attribute information about the writing implement or a writing medium main body. A writing motion (such as change in the tilt of the lead or change in the vibration and the like) differs according to each of the writing implement or the writing medium. Performing the handwriting identification according to attribute information can further increase accuracy of the handwriting identification. Further, owing to attribute information, it is possible to identify the characteristic influencing the motion characteristic of the lead, or the lead motion of the writing implement and/or its sheet (which is positioned under the writing medium). In accordance with such structures, because a comparison identifying mechanism recognizes the motion characteristic of the lead or the characteristic influencing the motion of the lead on the basis of attribute information to be able to utilize these characteristics for the handwriting identification, it can further increase accuracy of the handwriting identification. Attribute information is an ID number and so on for identifying the kind of writing implement, the handwriting medium or its sheet.

Further, the present invention detects the above change in tilt on the basis of the change in arrival position of the wave motion propagating between the lead and writing implement main body. As the tilt of the lead to the writing implement is changed, the characteristic of the wave motion such as a wave receiving position, which is placed in the writing implement main body, of the wave motion transmitted from the lead is changed. Therefore, the change in arrival position of the wave motion enables detection of a change in tilt of the lead. In addition, it is possible to detect the change in the tilt on the basis of a change in the distance between the writing implement main body and the lead.

Information for identifying an object (identifying object information; for example, approximate motion information approximated to handwriting motion information) is calculated from handwriting motion information of the detected lead motion according to a predetermined rule so as to execute the handwriting identification by comparing this identifying object information with inherent motion information previously stored. Approximate motion information approximately calculated from handwriting motion information according to the predetermined rule is used as this identifying object information. This approximation is a B-spline approximation, for example. Because the approximation can adequately eliminate unnecessary components (such as noise) in the handwriting identification, it is possible to execute the handwriting identification more easily, quickly and accurately.

Further, the present invention calculates a comparison unit divided from calculated identifying object information (for example, approximate motion information). Thus, the division of the comparison unit enables independent detailed comparison of each part of identifying object information, and as a result, it can further increase accuracy of the handwriting identification. Further, at this time, the division of the comparison unit on the basis of the predetermined condition can further increase accuracy of the handwriting identification because this division characteristic (such as the number of divisions, the division point in identifying object information and the like) itself is used as an index of the comparison identification.

Further, the present invention calculates the modified comparison unit by comparing the calculated comparison unit with the previously stored inherent comparison unit to carry out the comparison of the handwriting identification in each modified comparison unit. The comparison unit calculated by dividing the identifying object information sometimes differs in each calculation. This is because the handwriting itself of the same writer is different each time even if the comparison unit is calculated on the basis of a certain condition. When comparing is performed in the state where the comparison unit is significantly different from an inherent comparison unit, the accuracy of the comparison is reduced. Therefore, in the present invention, it can further increase accuracy of the handwriting identification by modifying the comparison unit. This modification can be performed by redividing and/or rejoining the comparison unit, for example.

BRIEF DESCRIPTION OF THE DRAWINGS

Now the present invention will be described in the following with reference to the appended drawings, in which.

DESCRIPTION OF PREFERRED EMBODIMENT

Now an embodiment in which a handwriting identification system according to the present invention is applied to a transaction system using a credit card will be described in the following with reference to the appended drawings.

Figure 14:
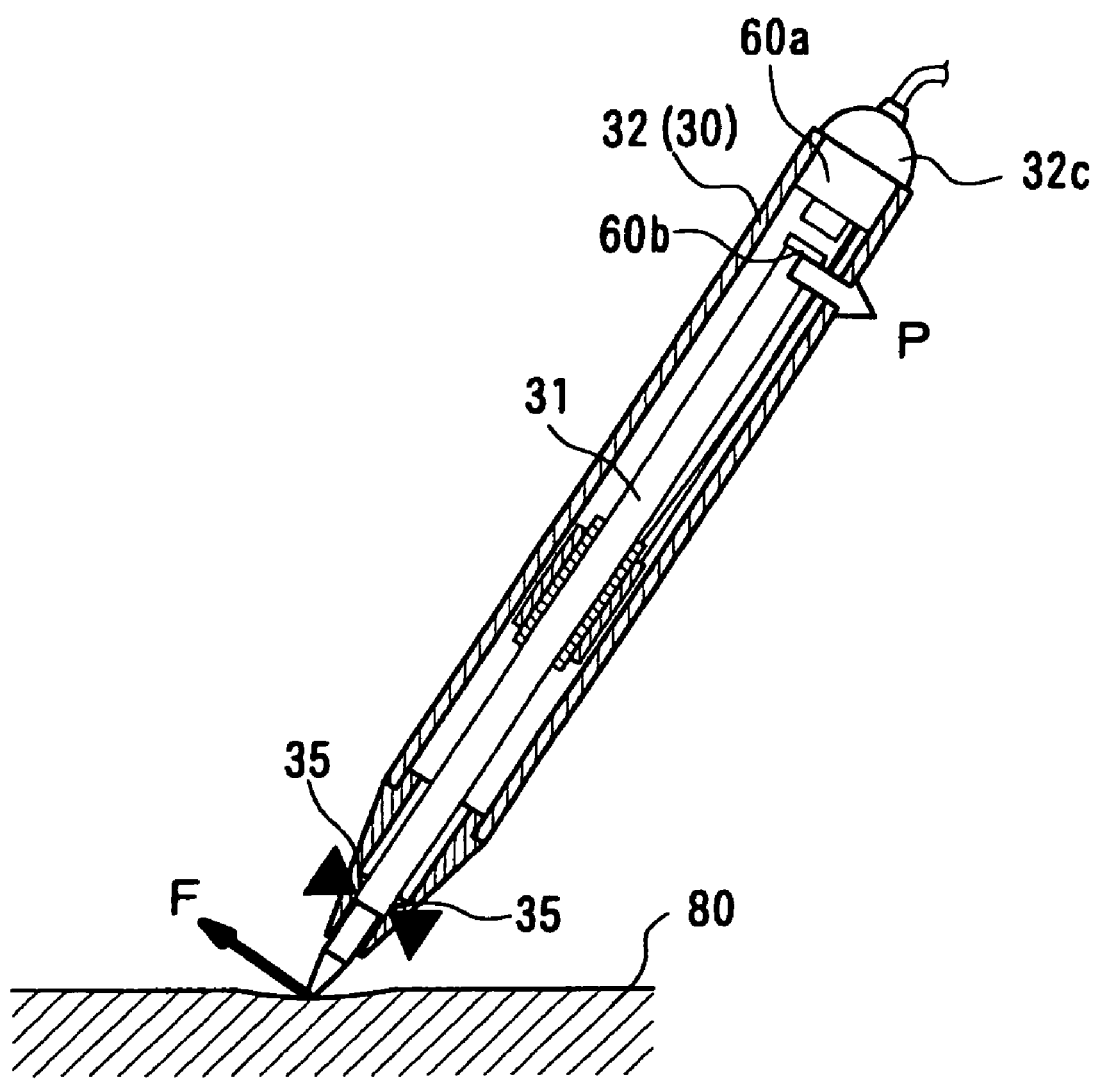
FIG. 14 is a drawing explaining a principle of generating the tilt with respect to the writing implement in handwriting in a handwriting identification system according to the embodiment of the present invention.

The principle of the handwriting identification will be described. The principle of the handwriting identification based on a change in tilt of a lead with respect to a writing implement will be described. FIG. 14 is a drawing for illustrating the change in the tilt with respect to the writing implement of the lead in handwriting. The lead is supported by a support 35 near a top edge of the writing implement main body 32, for example. At the time of handwriting to a writing medium, the lead accepts force F from the writing medium as a reaction of pressurizing. The lead changes the tilt relative to the writing implement main body according to force F. In an example in FIG. 14, when force is applied in the direction of arrow F, the lead supported by the support 35 is inclined in the direction of arrow P in a reverse direction according to force F. A tilt change detecting mechanism mentioned later detects this change in the tilt. The tilt change detecting mechanism functions as the mechanism for detecting the pressurization in the horizontal direction (the crossing direction in the axial direction of the lead 31) acting on the writing medium from the lead 31. The change in tilt with respect to the writing implement of the lead by handwriting is the inherent characteristic of the writer because the pressurizing motion at the time of handwriting is the inherent characteristic of the writer. By utilizing such a characteristic, in the embodiment, information based on the change in tilt of the lead is stored previously as inherent information in each writer, and the handwriting identification is executed by comparing handwriting information based on the change in the tilt of the lead at the time of handwriting with inherent information stored previously.

Figure 15:
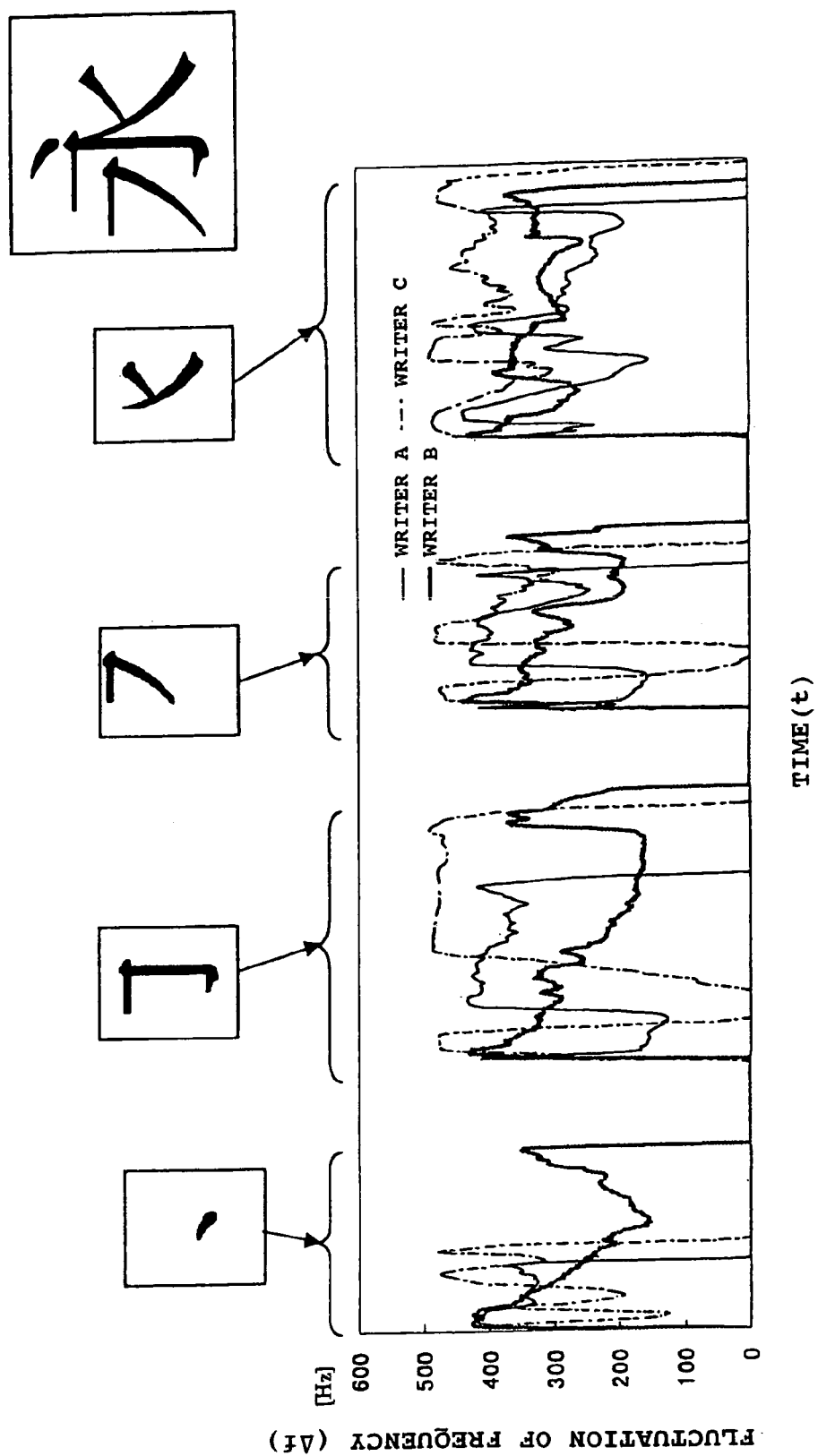
FIG. 15 is a drawing explaining a difference in the detected change in vibration for each writer in a handwriting identification system according to the embodiment of the present invention.

Next, the principle of handwriting identification on the basis of the change in the tilt of the lead will be described. The writing implement has a lead that is vibrated by a vibrating mechanism. It has become clear as a result of the inventors' study that the change in the lead vibration during handwriting is inherent to the writer. In FIG. 15, there is shown the state of change in the frequency of the lead at the time of handwriting a Chinese character "永" by a plurality of writers using the system in this embodiment. In this drawing, a horizontal axis shows time, and a vertical axis shows a finite difference between the frequency of a non-contact condition with the writing medium (the inherent frequency) and the frequency, respectively. From viewing this drawing, it can understand that the change in the vibration of the lead is a feature inherent to the writer. By using such characteristic, in the embodiment, information on the change in vibration, such as a change in the frequency, is stored previously as inherent information for each writer, and the handwriting identification is executed by comparing handwriting information based on the change in vibration at the time of handwriting with inherent information stored previously.

Figure 1:
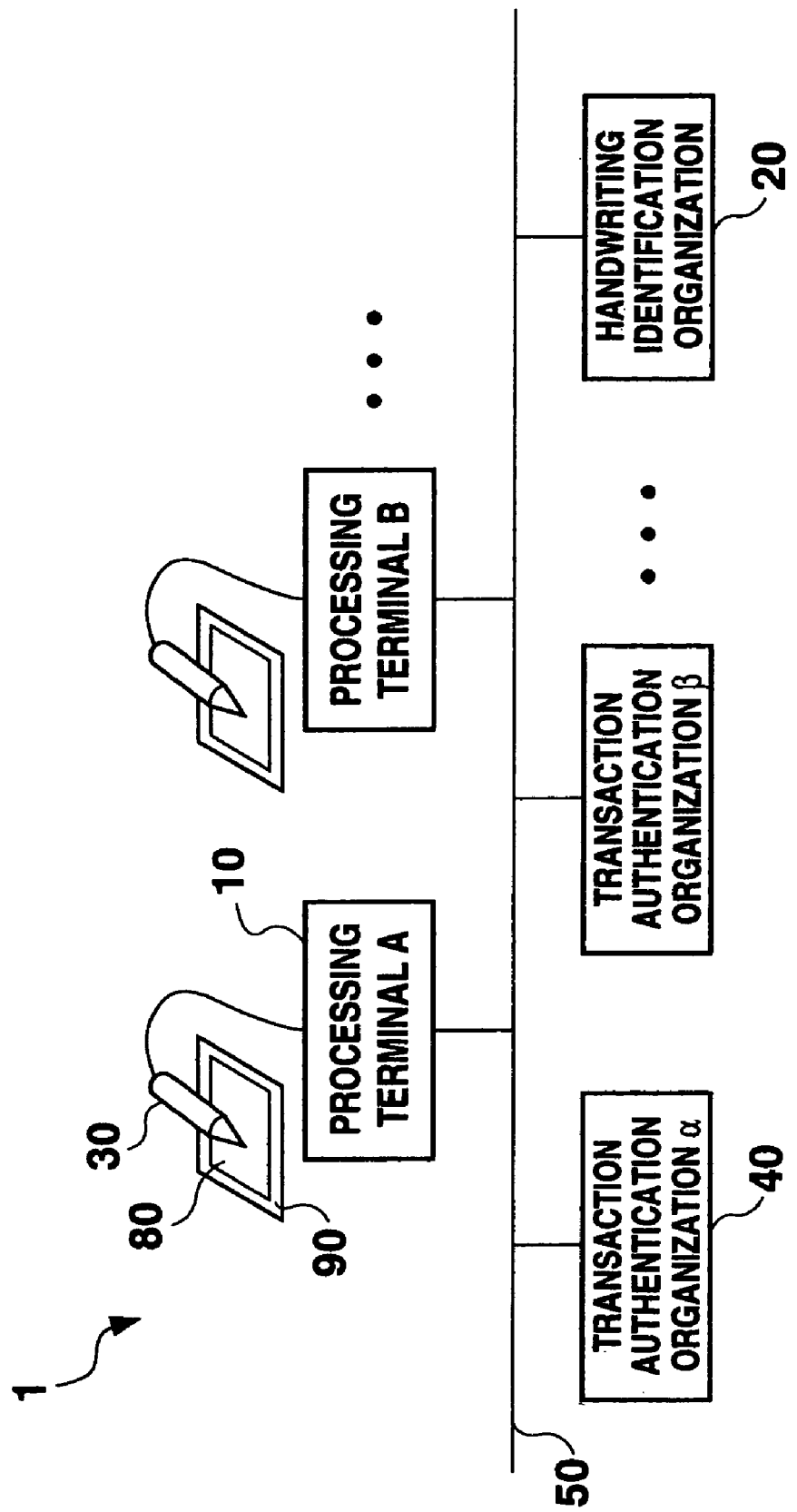
FIG. 1 shows an overall structure of a handwriting identification system according to an embodiment of the present invention.

Next, the overall structure of the transaction system in the embodiment will be described. FIG. 1 shows an overall structure of this system. This system 1 is provided with a processing terminal 10, a handwriting identification organization 20 and a transaction authentication organization 40, and these are connected by a communication line 50. The trade transaction (for example, a purchase using a credit card) is performed in the processing terminal 10 (for example, an electronic register). The processing terminals 10 are each connected to the writing implements 30. The detected change in the tilt and the detected change in the vibration with respect to the writing implement main body 32 of the lead of the writing implement 30 at the time of handwriting is inclined in handwriting motion information produced in the processing terminal 10. The authentication of the transaction is processed in the transaction authentication organization 40 (for example, a card company). This authentication is processed with reference to individual information stored previously. Inherent information of the handwriting is stored previously for each individual or each handwriting in the handwriting identification organization 20. The handwriting identification is processed by comparing handwriting information based on detected handwriting motion information (for example, the change in the tilt, the change in the vibration and the like) for the lead motion and matching inherent information stored previously in the storage mechanism. Handwriting is performed in the state of positioning the writing medium 80 on the sheet 90, and the writing medium 80 consists of a form for the credit card laminated with a transfer paper.

Figure 2:
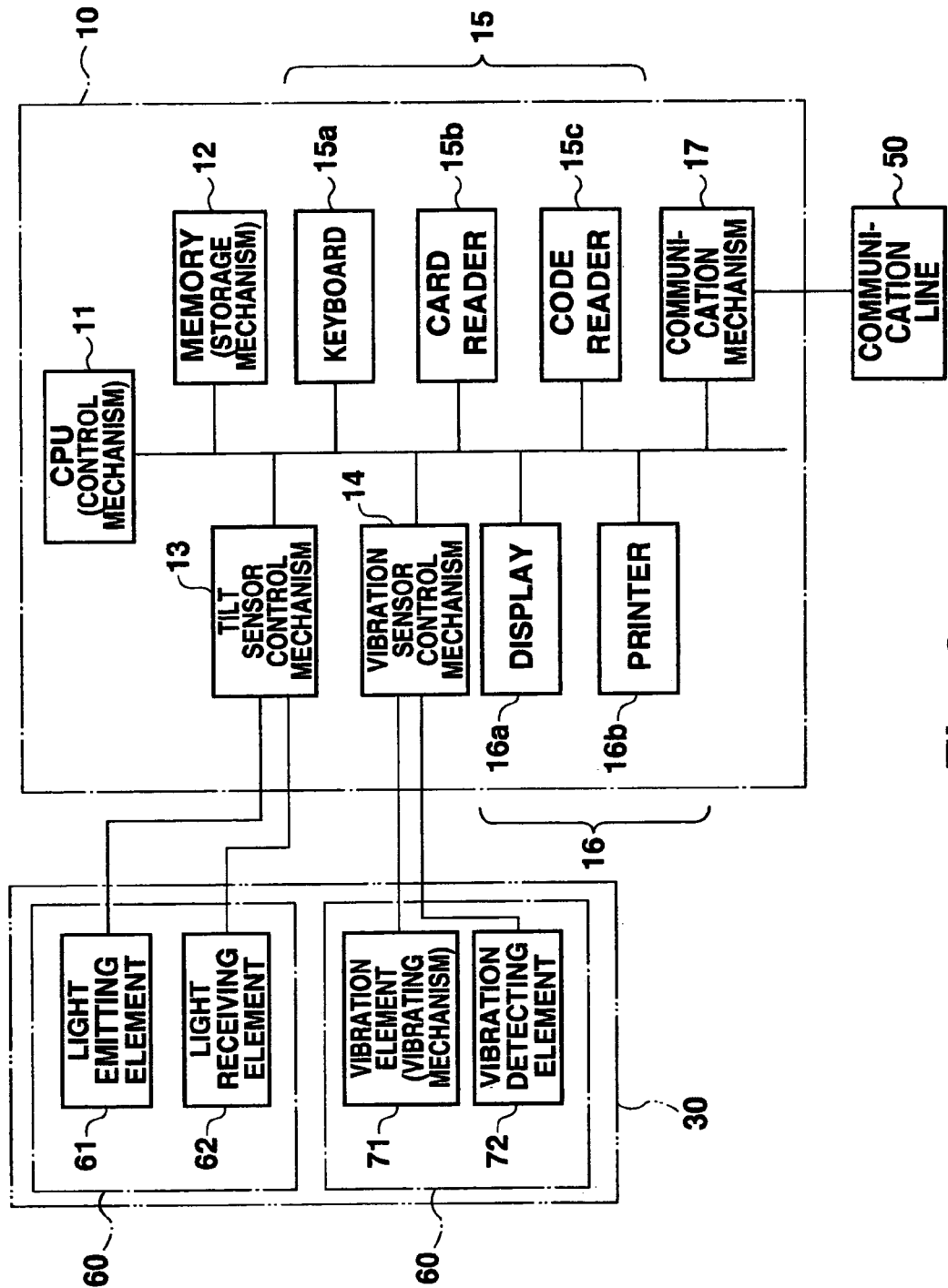
FIG. 2 shows an overall structure of a processing terminal of the handwriting identification system according to the embodiment of the present invention.
Figure 3:
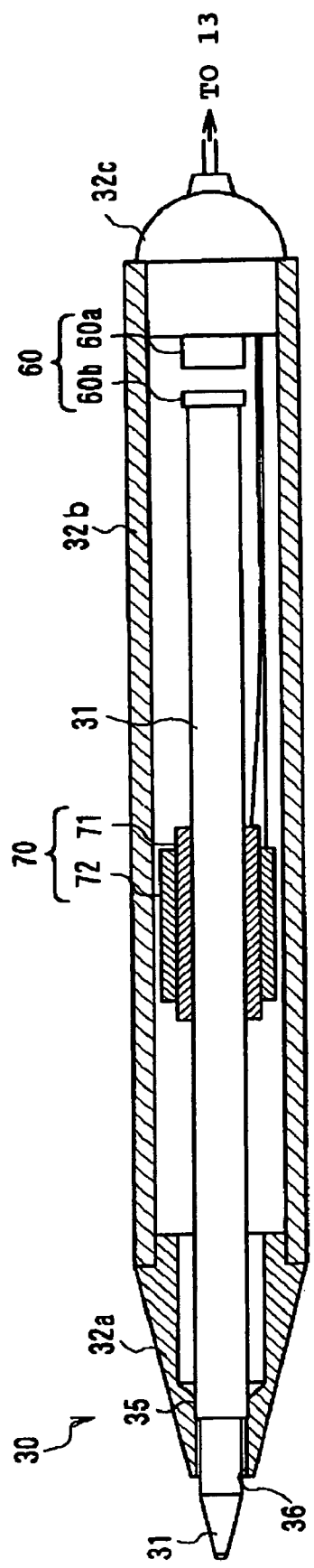
FIG. 3 shows an overall structure of a writing implement of the handwriting identification system according to an embodiment of the present invention.
Figure 6:
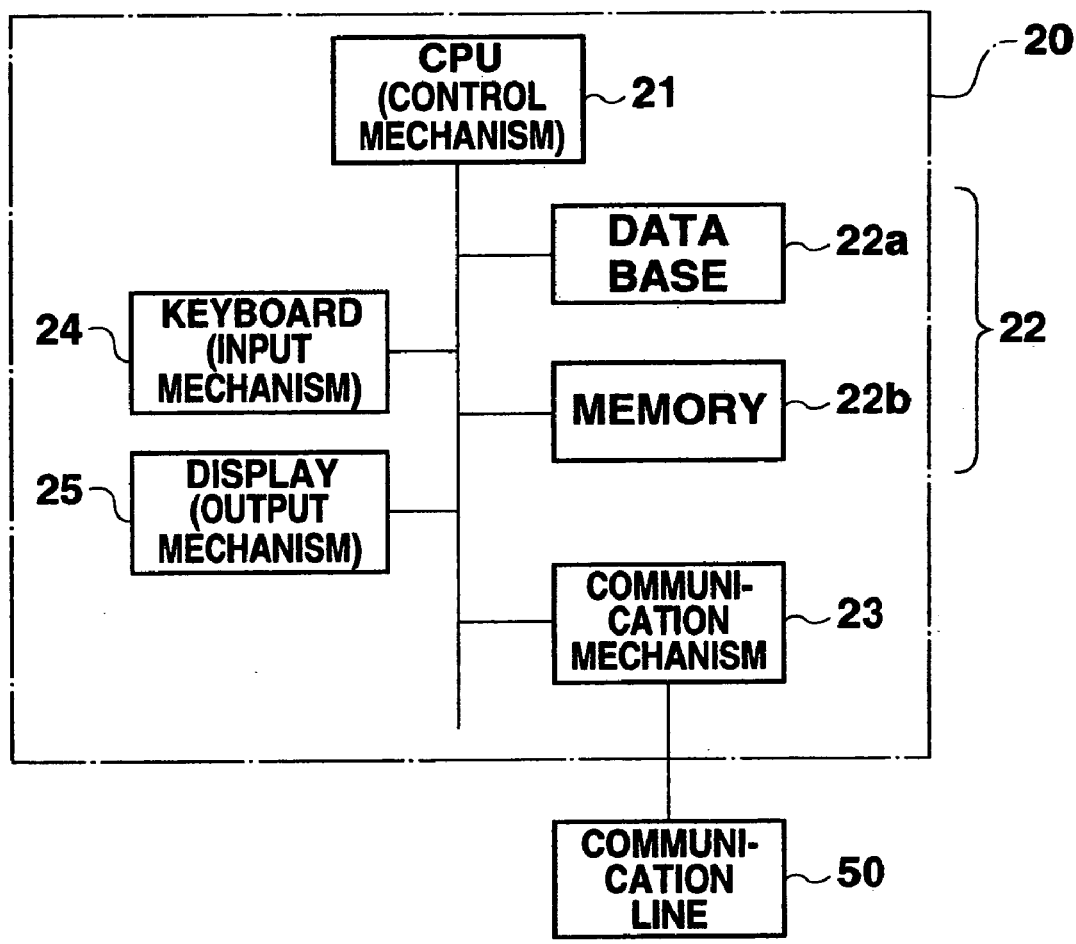
FIG. 6 is an overall structure of the handwriting identification organization of a handwriting identification system according to the embodiment of the present invention.

Now, each part constituting a system in the present invention will be described in the following. FIG. 2 shows an overall structure of a processing terminal 10, FIG. 3 shows that of a writing implement 30, and FIG. 6 shows that of a handwriting identification organization 20.

First of all, the processing terminal 10 will be described below. The processing terminal 10 is provided with a control mechanism 11 (e.g., CPU), a storage mechanism (e.g., memory), tilt sensor control mechanism 13, a vibration sensor control mechanism 14, an input mechanism 15 (for example, a keyboard 15a, a card reader 15b or a code reader 15c), an output mechanism 16 (for example, a display 16a or a printer 16b) and a communication mechanism 17, and these are connected to each other through a bus, for example.

The control mechanism 11 controls each part of terminals, and furthermore calculates, on the basis of tilt information generated in the tilt sensor control mechanism and vibration information generated in the vibration sensor control mechanism, to produce handwriting information according to the handwriting.

The storage mechanism 12 stores not only a parameter (for example, attribute information of the writing implement or the writing medium) for controlling and processing the terminal but also handwriting motion information of the detected lead motion. In this embodiment, information identifiable to a relative motion characteristic of the lead 31 or information identifiable to a characteristic influencing the lead motion at the time of writing is stored as attribute information of the writing implement 30 or the writing medium 80. Each piece of information shows, for example, such information as a kind, a type and so on, and the relative motion characteristic of the lead 31 is, for example, length, elasticity, weight, natural frequency and the like. Furthermore, the characteristic influencing the lead motion (for example, tilt, frequency and so on) of the writing medium and/or the sheet located under the writing medium at the time of handwriting is material, elasticity, hardness and so on, for example.

The input mechanism 15 inputs such information necessary to process transaction content information (for example, a kind, a name, an amount of money 1 and so on of the purchased goods) and attribute information of a person carrying out the transaction and the like. In this embodiment, the input mechanism 15 consists of the keyboard 15a, the card reader 15b and the code reader 10c. The card reader 15b reads attribute information of a card owner (e.g., the wisher for the transaction) stored a card. In addition, the code reader 15c reads the encoded transaction content information (for example, a bar code indicating the attribute of the purchased goods).

The output mechanism 16 outputs information. Outputted information here is such information as showing inputted information and the processed result, for example. In this embodiment, the outputted mechanism 16 includes the display 16a and the printer 16b. The communication mechanism 17 is connected to communication line 50 to exchange information between the processing terminal 10 and exteriors.

The writing implement 30 is shown as a ball point pen in this embodiment. As shown in FIG. 3, the writing implement 30 comprises the lead 31, a top edge member 32a, a writing implement main body 32 having an intermediate member 32b and an end edge member 32c, a tilt change detecting mechanism 60, and a vibration detecting mechanism 70. The cylindrical intermediate member 32b is provided with the top edge member 32a and the end edge member 32c at both ends in its longitudinal direction, respectively. The lead 31 is fixedly supported by a support 35 provided in the top edge member 32a, and one end of the lead 31 is projected to the outside from an opening 36 provided in the top edge member 32a. The other end of the lead 31 is formed with a reflector 60b, the end edge 32c is provided with a sensor 60a opposite to the reflector 60b. In this embodiment, a distance from the reflector 60b (in other words, an object for detecting the tilt vibration) to the support 35 is longer than the distance from a contact portion of the lead 31 bringing the writing medium into contact with the support 35. The lead 31 is provided with a vibration element 71 and a vibration detecting element 72, which generate the vibration in the axial direction of the lead 31.

Figure 4:
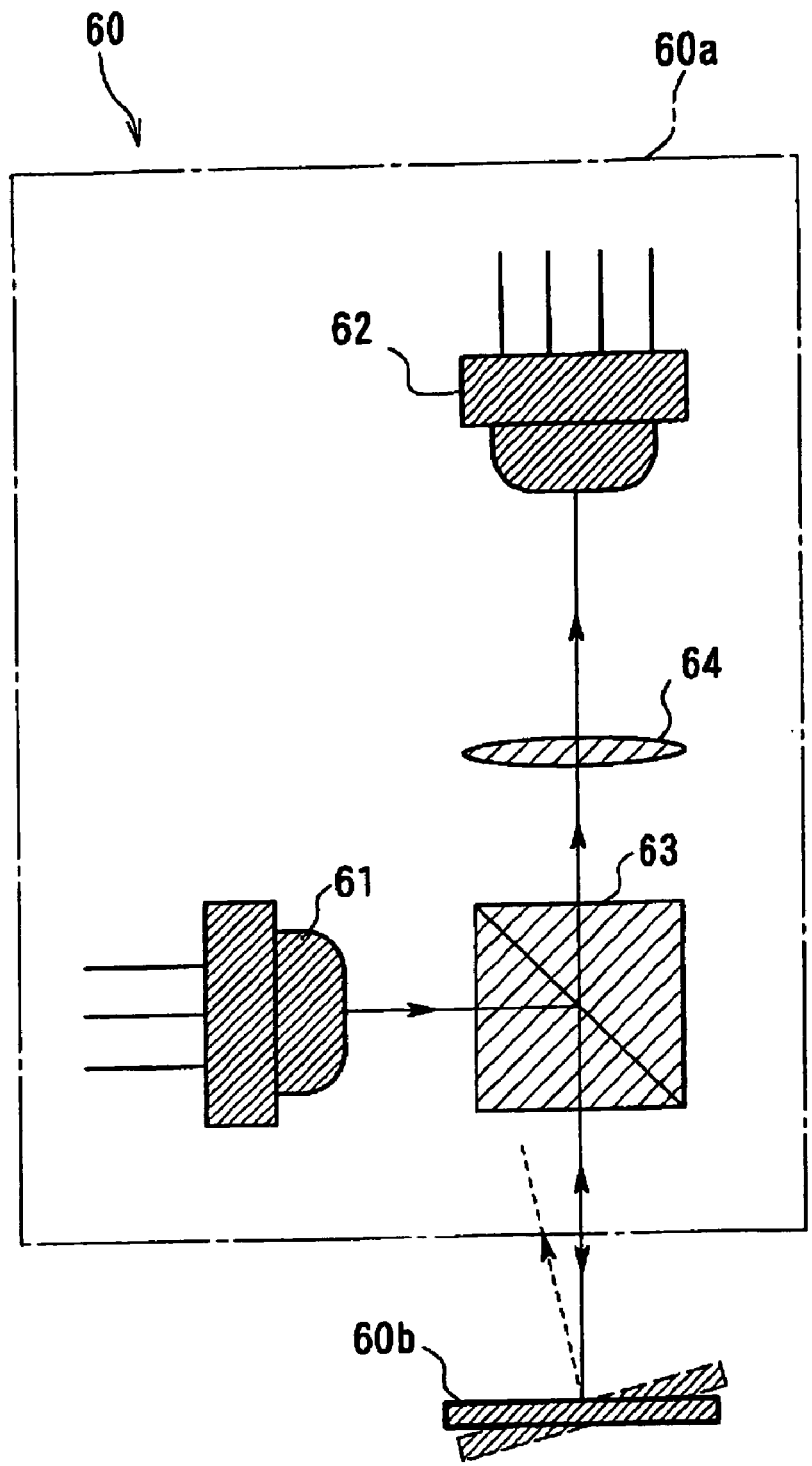
FIG. 4 shows an overall structure of a tilt change detecting mechanism of the handwriting identification system according to the embodiment of the present invention.

The tilt change detecting mechanism 60 detects the change in the tilt with respect to the writing implement main body 32 of the lead 31. The tilt change detecting mechanism 60 in this embodiment detects the change in the arrival position of a wave motion propagating between the writing lead 31 and the writing implement main body 32. One example is shown in FIG. 4. The tilt change detecting mechanism 60 includes the sensor 60a provided with the writing implement main body 32, and the reflector 60b provided with the end edge of the lead 31. The sensor 60a radiates an infrared beam to the reflector 60b as the wave motion in the axial direction of the writing implement 31, and then the reflector 60b reflects this infrared beam to the side of the sensor 60a. The infrared beam reflected in the reflector 60b enters into the sensor 60a and is detected. The sensor 60a consists of a beam emitting element 61 such as a LED, as a wave transmitting section, a light receiving element 62 such as a photodiode, as a wave receiving section, a beam splitter 63, and a collimating lens 64. The LED 61 radiates the infrared beam toward the beam splitter 63. The infrared beam is radiated in the perpendicular direction with respect to the axial direction of the writing implement 30. Next, this infrared beam is reflected in the direction (that is, the axial direction) of the reflector 60b in the beam splitter 63.

This reflected infrared beam becomes the infrared beam to be radiated from the sensor 60a to the reflector 60b. The reflector reflects the infrared beam radiated from the sensor 60a, to the side of the sensor 60a. The infrared beam reflected in the reflector 60b arrives at the photodiode 62 through the beam splitter 63 and the collimating lens 64 in this order to be detected at that point.

Figure 5:
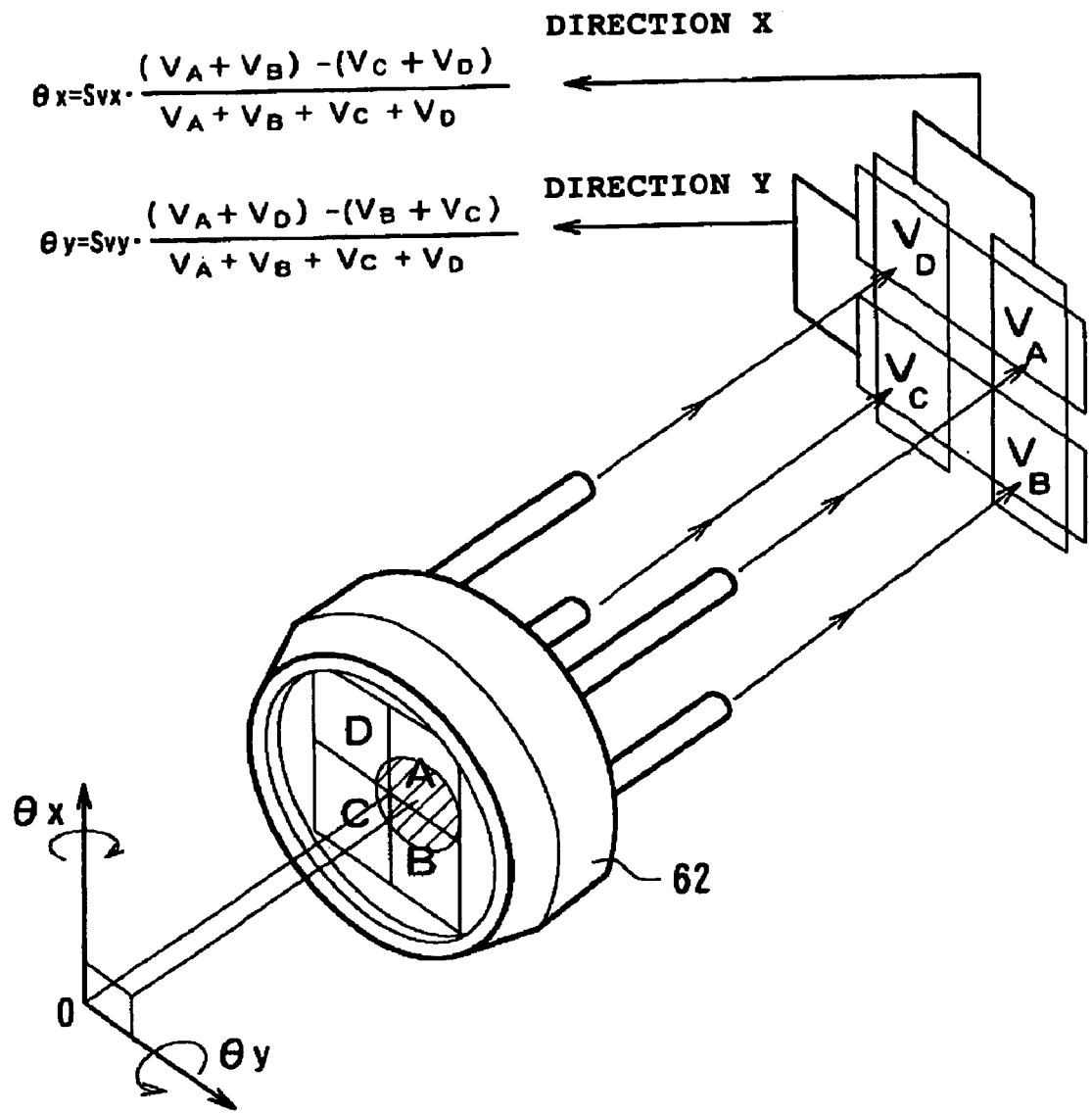
FIG. 5 is a drawing explaining a principle of detecting the change in the tilt of the tilt change detecting mechanism as shown in FIG. 4.

The structure for detecting the tilt by the tilt change detecting mechanism 60 will now be described in the following. FIG. 4 shows the drawing for explaining the light receiving in the photodiode 62 shown in FIG. 4 mentioned above. The photodiode 62 has a plurality of light regions (A, B, C, D) in a crossing direction (e.g., the perpendicular direction) with respect to the traveling direction of the infrared beam, and then the change in the light receiving position of the infrared beam is detected from the quantity of the received light. The light receiving position of the infrared beam in the receiving plane is moved when the infrared ray beam is tilted, it decreases in the quantity of the light received in the receiving regions on the moving origin, and, on the other hand, it increases in the quantity of the light received in the receiving regions on the moving destination. As the receiving position of the infrared beam is dependent upon the tilt of the reflector 60b, and specifically the tilt with respect to the writing implement 32 of the lead 31, it is possible to ascertain the tilt with regard to the writing implement 32 of the lead 31 from the change in the light receiving quantity in a plurality of the light receiving regions. That is, the tilt change detecting mechanism 60 detects the change in the tilt of the wave motion by the change in the arrival position of a wave motion propagating between the lead 31 and the writing implement main body 32. In the example as shown in FIG. 5, there are provided a total of 4 light receiving regions (A~D) in the shape of a matrix of two by two in each of x and y directions. In an arrangement of the light receiving regions as shown in FIG. 5, the tilt (θx, θy) in each direction can be obtained from the following formulas, for example.

$$\theta x = Svx \cdot \frac{(V_A + V_B) - (V_C + V_D)}{V_A + V_B + V_C + V_D}$$

$$\theta y = Svy \cdot \frac{(V_A + V_D) - (V_B + V_C)}{V_A + V_B + V_C + V_D}$$

Where Va, Vb, Vc, Vd,: Quantity of light received at to each light receiving region A, B, C and D Svx, Svy: coefficient showing a correlation between the light receiving quantity in each of x and y directions and the tilt of the lead 31

Further, a section of the infrared beam is formed in a shape having line symmetry (for example, a circle) with respect to x and y axial directions, adjusted so as to make the receiving quantity of each light receiving regions equal when the lead 31 is at an initial position, and moreover adjusted to cause the infrared beam to arrive at the plural regions, for example, all 4 regions mentioned above in the case of a maximum displacement in the lead 31. This is carried out, for example, by arrangement in a mounting position and/or the tilt of the sensor 60a or the reflector 60b.

The tilt sensor control mechanism 13 controls each part in the tilt change detecting mechanism 60, calculates the tilt detection, and produces the tilt information based on the change in the detected tilt.

The structure of vibration of the lead 31 in the writing implement 30 will be now described below. The vibrating mechanism for vibrating the lead 31 is the same as the vibrating mechanism disclosed in a publication of Japanese Patent Laid-Open Publication No. Hei 9-145690. The vibration sensor control mechanism 14 includes a filter circuit (or a gain change compensation circuit) and an amplifier circuit, which are not shown in any drawing, and makes up a self-excitation oscillation circuit in connection with a vibration element 71 and a vibration detecting element 72 which are provided in the lead 31.

The vibration sensor control mechanism 14 carries out control in each part of the vibration detecting mechanism 70 and the operation on the vibration detection, and produces vibration information on the basis of change in the detected vibration.

Figure 7:
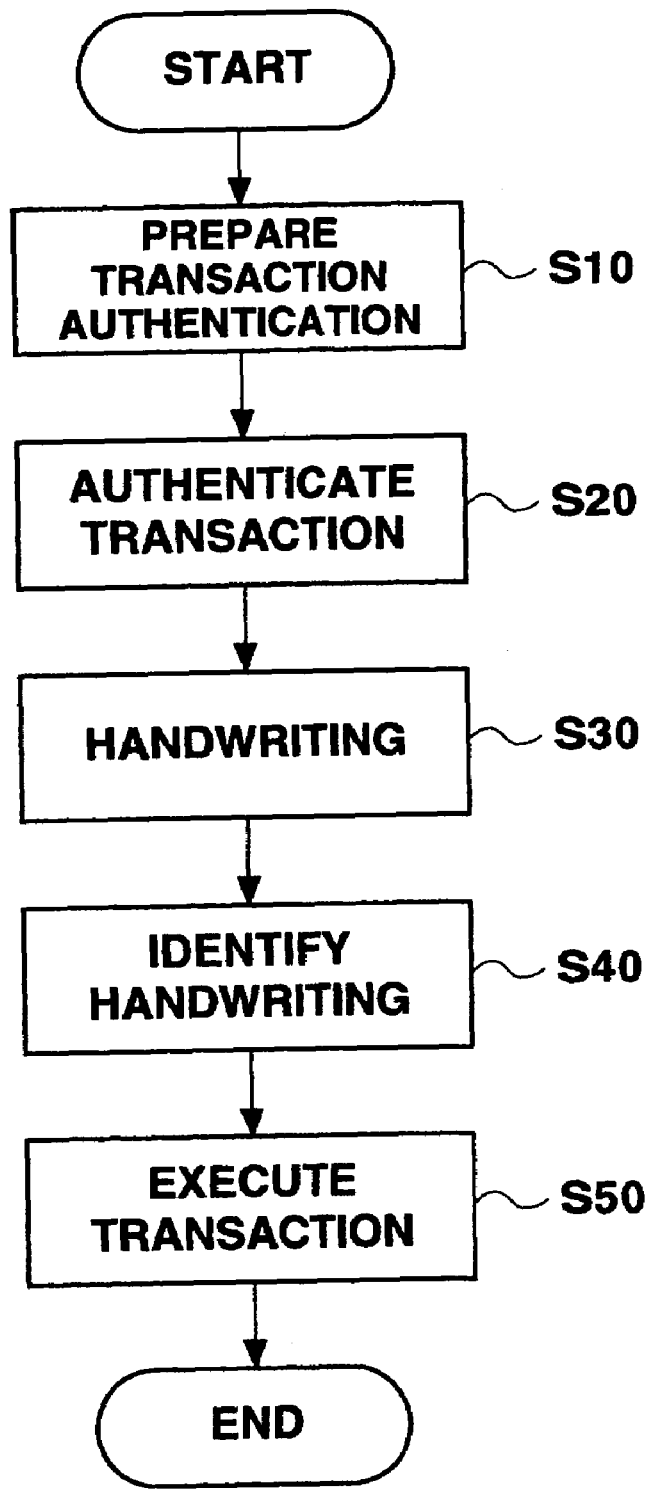
FIG. 7 is a flow chart illustrating a method for identifying handwriting according to the embodiment of the present invention.

Next, the substantial structure of the handwriting identification organization 20 will be described. The handwriting identification organization 20 is provided with a control mechanism 21 (such as the CPU), a storage mechanism 22 (for instance, a data base 22a, a memory 22b), an input mechanism 24 (such as the key board), an output mechanism 25 (such as the display), and a communication mechanism 23. The control mechanism 21 executes the overall control in the handwriting identification organization 20 and the operation on the handwriting identification. In the storage mechanism 22, inherent information (for example, inherent information based on the change in the previously obtained tilt, inherent information on the change in the previously obtained vibration of the lead 31 at the time of writing and so on) is stored in the data base 22a for each writer, and information about the operation on the handwriting identification is stored in the memory 22b. Inherent information is referred to at the time of the handwriting identification, and shows a different value for each individual or handwriting performance at the time of this identification. Further, this inherent information can take various forms (an inherent comparison unit, an inherent value and the like). The input mechanism 24 and the output mechanism 25 input and output each item of information used for the operation on the handwriting identification. The communication mechanism 23 is connected to the communication line 50 to exchange information between the handwriting identification organization and the outside Next, a credit card transaction will be described. FIG. 7 is a flow chart for explaining the transaction. The credit card transaction in the embodiment executes transaction authentication preparation S10 in the processing terminal 10, transaction authentication S20 in the transaction authentication organization section 40, processes the handwriting S30 in the processing terminal 10, performs handwriting identification S40 in the handwriting identification organization 20, and executes a transaction S50 in the processing terminal 10, in that order.

First, the preparation is carried out in the event of receiving the transaction authentication (for example, the transaction authentication by the credit card) (step S10 of preparing the transaction authentication). In this step, information necessary to the transaction authentication is inputted from the input mechanism 15 in the processing terminal, for example. More concretely, attribute information of a person wanting to carry out the transaction (the person's credit card number) and transaction content information (such as attribute information of a purchase article, the amount of the transaction, and a payment method) are inputted. Information mentioned above is transmitted to the transaction authentication section 40 as transaction authentication demand information together with the present time and identification information in the processing terminal (the processing terminal ID) In this step S10, the processing ID is produced for identifying the transaction processing. The processing ID executes, hereafter, the transmitting and the receiving of information to be utilized for the identification of the work in each part of the system.

Next, the transaction authentication step S20 will be described. The transaction authentication organization 40 judges the transaction on the basis of attribute information of the person wanting to carry out the transaction and transaction content information, with reference to information about the transaction (such as transaction results of payment the previous time, and any transaction restrictions with respect to a limit of the transaction amount). The result is returned to the processing terminal 10 as transaction authentication information.

Figure 8:
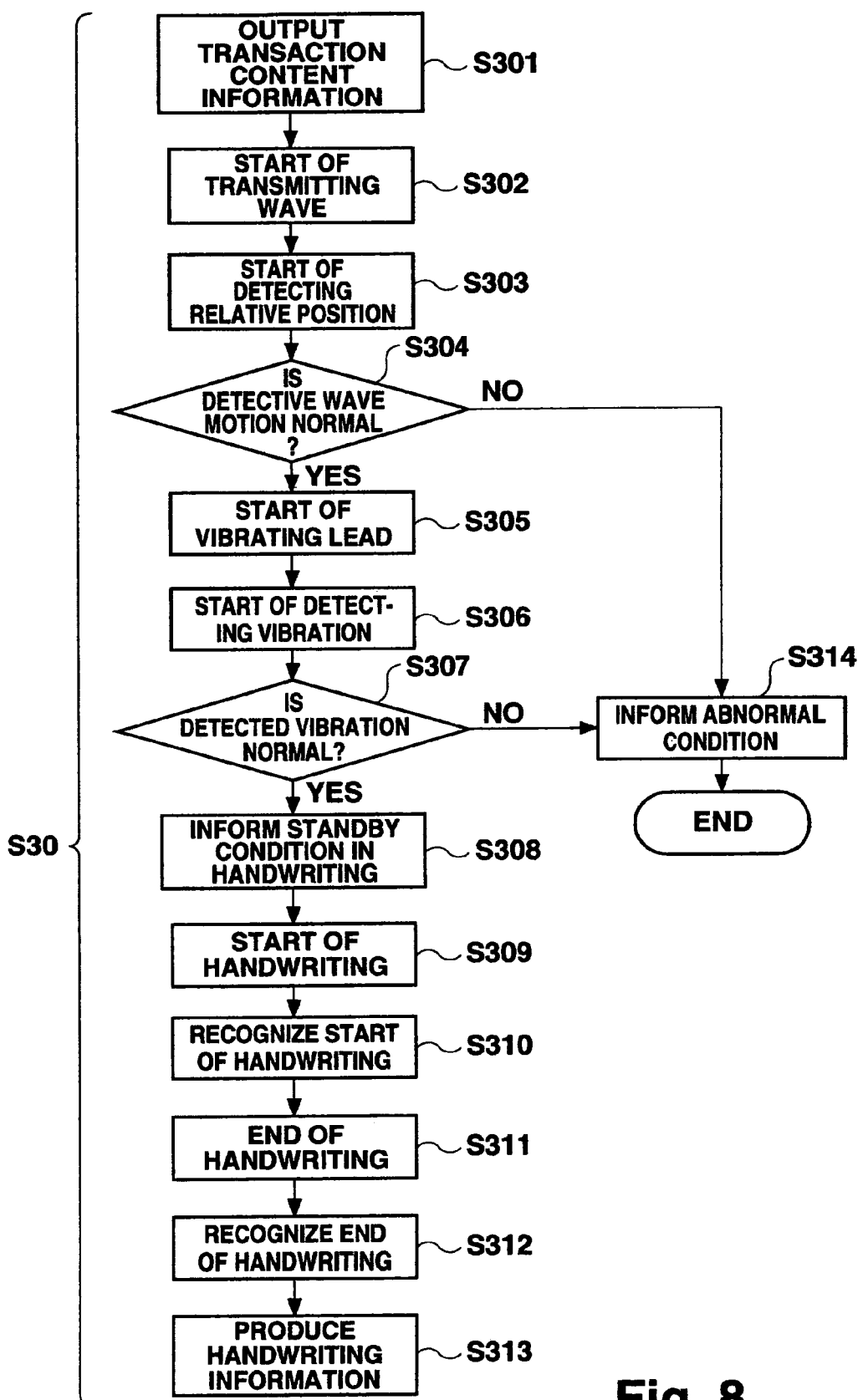
FIG. 8 is a flow chart illustrating a handwriting step in a method for identifying the handwriting according to the embodiment of the present invention.

Next, the handwriting step 30 will be described. FIG. 8 is a flow chart subdividing this step S30. Prior to the handwriting, the output mechanism 16 in the terminal 10 outputs transaction content information (step S301 of outputting transaction content information). More concretely, the printer 16b prints the name and amount of the purchased goods on a form, which has a signature column, for the credit card. The person wanting to carry out the transaction can thereby write confirmation of the content of the transaction.

In parallel with the step 301 mentioned above, the tilt sensor control mechanism 13 is started so as to start the transmitting from the transmitting wave part 61 (step S302 of start of transmitting wave), and next, the detection in the tilt (relative position) with respect to the writing implement of the lead 31 (step S303 of start of detecting tilt (relative position) to lead) is started. Next, the control mechanism 11 confirms whether the condition in the detected wave motion is normal or not (step S304 of confirming detected wave motion). More concretely, the control mechanism 11 confirms whether or not the infrared beam of predetermined intensity in each light emitting region is detected in the preset period from the start of transmitting the wave, for example.

Furthermore, in the step S301 mentioned above, the vibration sensor control mechanism 14 is started to start the vibration of the lead 31 (step S305 of start of vibrating lead) and to start to detect the vibration change by the vibration sensor control mechanism (step S306 of starting to detect vibration). Next, the control mechanism 11 confirms whether the condition in the detected vibration is normal or not (step S307 of confirming detected vibration). More concretely, the control mechanism 11 confirms whether or not the vibration in the predetermined condition (such as inherent frequency ±10 in frequency) and time of the lead is detected in the preset period from the start of the vibration, for example.

When the judgement of the detected wave motion or vibration is normal (steps S304 and S307) and the output of transaction content information (step S301) is completed, a signal is output indicating that handwriting can be commenced (step S308 of informing standby condition in handwriting). More concretely, a message of "Sign your name in the signature column, please" is displayed by the display 16a, for example. On the basis of the output result, the person wanting to carry out the transaction starts the handwriting in the predetermined position of the writing medium (such as the signature column in the form for the credit card) (step S309 of start handwriting). On the other hand, when the judgement of the wave motion or the vibration is not normal in the steps S304 and S307 above, the effect of the abnormal condition of the wave motion or the vibration of the lead is informed by the output mechanism 16 such as the display 16a (step 314 of informing the abnormal condition of the detected wave motion or vibration). Then, the processing of the writing implement 30 or the processing terminal 110 is completed. Thus, judging the condition of the detected wave motion or the vibration of the lead can identify the handwriting more accurately. In addition, the processing in parallel with the step of outputting the content of the transaction and the other steps (S302~S307) can produce handwriting information more quickly.

Figure 9:
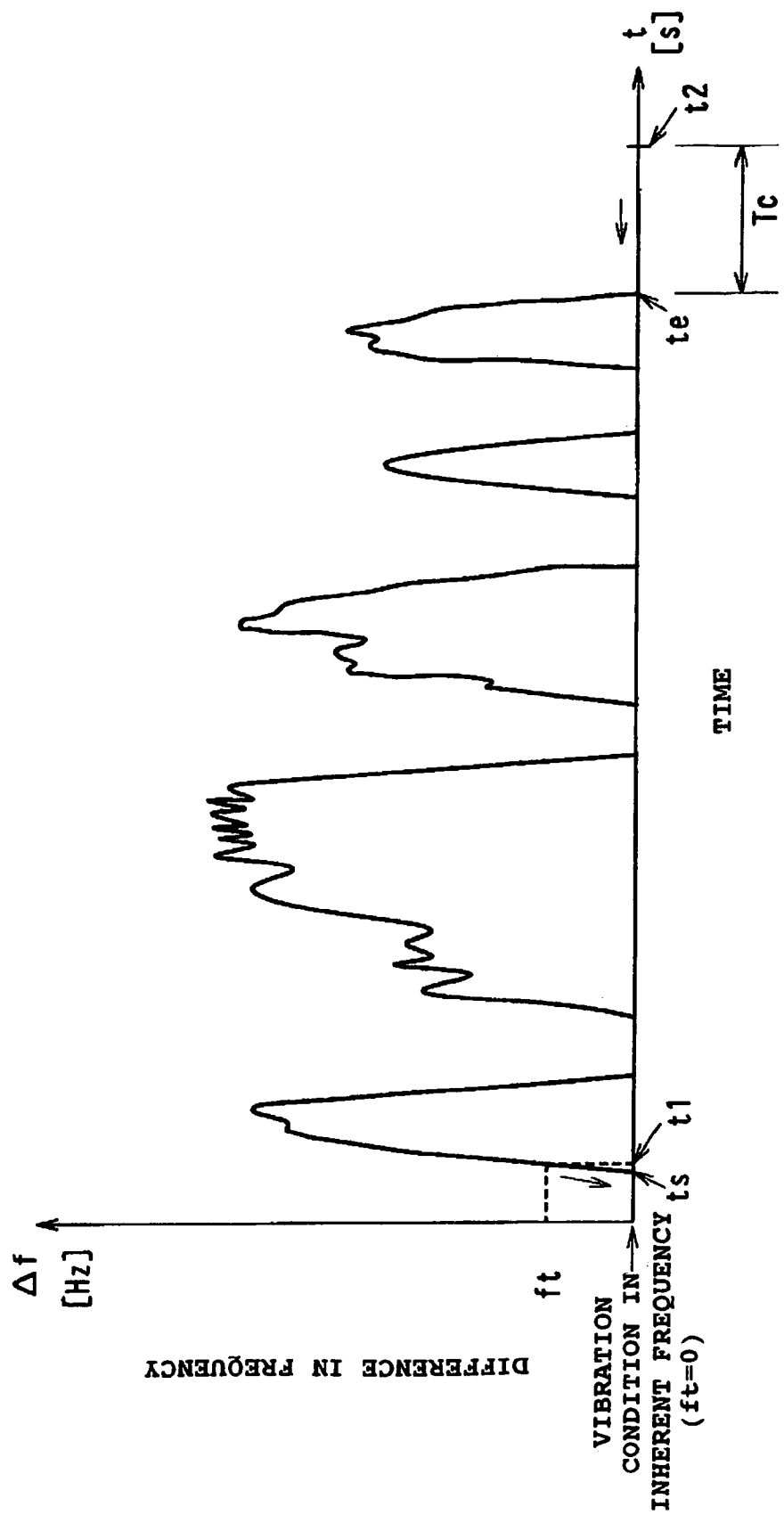
FIG. 9 is a drawing illustrating the detection of start and completion in the method for identifying the handwriting according to the embodiment of the present invention.

Next, the start of the handwriting is recognized (step S310 of recognizing the start of handwriting). In this embodiment, the start of the handwriting is recognized on the basis of the vibration change. One example is shown in FIG. 9. In this drawing, a horizontal axis shows time, and a vertical axis shows a finite difference between the inherent frequency and the frequency, respectively. After starting the vibration, the control mechanism 11 recognizes the start of the handwriting at the first time of reaching the predetermined value ft in the change of frequency. Next, the control mechanism 11 refers to vibration information sequentially stored in the storage mechanism 12, going back from the time t1 reached at the predetermined value ft, detects the starting time point ts of the change in the inherent frequency, and recognizes this time point ts as the handwriting starting time point.

When the handwriting is finished, (step S311 of finishing the handwriting), the finishing of the handwriting is recognized (step S312 of recognition of finishing the handwriting). The finishing of the handwriting is also recognized on the basis of the change in the vibration. Similarly, one of the examples is explained with reference to FIG. 9. After recognizing the start of the handwriting, the control mechanism 11 recognizes the finishing of the handwriting at the time point t2 when the vibration of inherent frequency has continued for a predetermined time (Tc). Next, the control mechanism 11 refers to vibration information stored in the storage mechanism 12, with going back from this time point t2, detects the starting time point te of the continuous vibration, and recognizes this time point te as the handwriting finishing time point.

Furthermore, the control mechanism 11 produces handwriting information as a reference in identifying the handwriting. In the embodiment, handwriting information includes many items of information such as tilt information and vibration information in the interval from the handwriting starting time point to the handwriting finishing time point (hereafter, handwriting motion information is the general term for tilt information and that of vibration), information that can identify the relative motion characteristic of the lead 31 (for example, the characteristic and so forth related to the tilt or vibration), information that can identify the characteristic of the writing medium 80 or the sheet 90 which affects the motion of the lead 31, and attribute information. Such information is used to identify the handwriting in the handwriting identification organization 20. Produced handwriting information is transmitted to the handwriting identification organization 20 through the communication line by the communication mechanism 17. In addition, at the time of carrying out the handwriting in the handwriting step S30 explained here, the writing medium 80 is located on the sheet 90 (not shown). Providing the sheet 90 in the above can control the unstable tilt or vibration generated according to the location of the writing medium 80.

Figure 10:
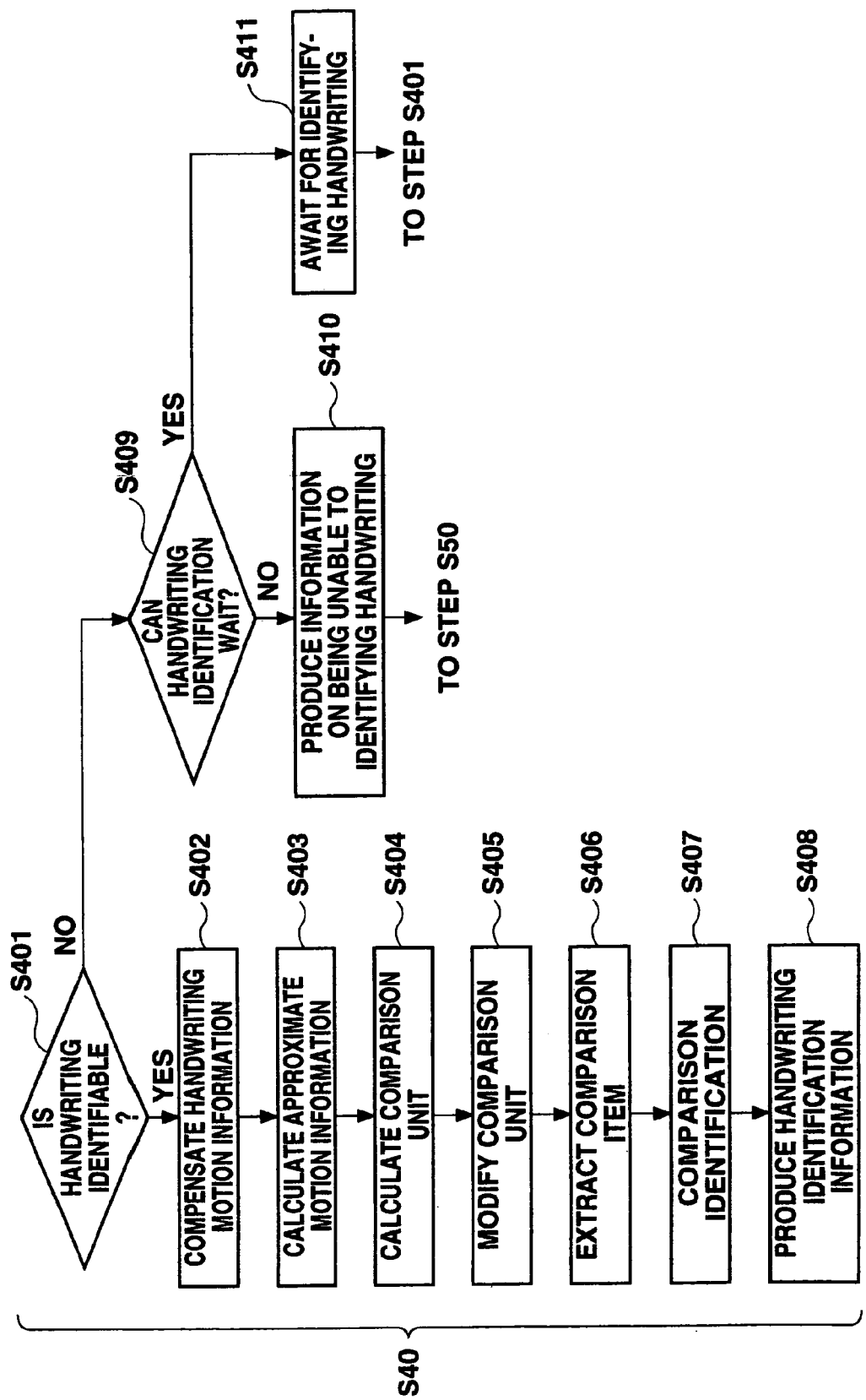
FIG. 10 is a drawing illustrating the detection of start and completion in the method for identifying handwriting according to the embodiment of the present invention.

Next, the step S40 of identifying the handwriting will be described. FIG. 10 is a flow chart subdividing this step. The control mechanism 21 in the handwriting identification organization 20 determines whether the handwriting is identifiable (step S401 of determination of identifying the handwriting or not) or not. More concretely, the control mechanism 21 confirms whether or not the condition of handwriting information is normal, and the operating state (normality/abnormality in each part, busyness, etc.) in each part of the handwriting identification structure. The control mechanism 21 determines whether the handwriting identification can wait or not (step S409 of determination of waiting for the handwriting identification or not). Even if the operating state is normal, when the handwriting identification cannot be executed instantly because of busyness, the control mechanism 21 causes the identification processing to wait in the storage mechanism 22 (such as the memory 22b), and produces information showing that the control mechanism 21 cannot immediately identify handwriting and transmits this information to the processing terminal 10. Moreover, when the handwriting is not identifiable because the operation of each part is abnormal, the control mechanism 21 produces information showing the handwriting is not identifiable (step S410 of producing information of not identify the handwriting) and transmits this information to the processing terminal 10 (to step S50). Thus, the identification of the handwriting can be carried out more accurately by determining whether the handwriting is identifiable or not (step S401).

When it is determined that the handwriting is identifiable in the step 401 in the above, handwriting motion information is compensated according to such attribute information as information that can identify the relative motion characteristic of the lead 31, and information influencing the motion of the lead 31 into the writing medium 80 or the sheet 90 (step S402 of compensating handwriting motion information) As the motion of the lead 31 differs according to the relative motion characteristic, or the characteristic of the writing medium 80 or the sheet 90, it can improve the precision of the handwriting identification by this step S402. The storage mechanism 22, such as the data base 22a, in the handwriting identification structure 20 stores previously a motion information compensation function according to information identifiable to the relative motion characteristic of the lead 31, and the characteristic influencing the motion of the lead 31 into the writing medium 80 or the sheet 90. The compensation function offsets only a predetermined amount of handwriting motion information. The control mechanism 21 calls the compensation function to compensate handwriting motion information, based on the relative motion characteristic or the vibration characteristic of the lead 31 and the characteristic influencing the motion of the lead 31 into the writing medium 80 or the sheet 90 in received attribute information. Multiplying these compensation functions compensates a plurality of the compensation functions, for example.

Next, approximate motion information is calculated by approximating handwriting motion information according to a predetermined rule (step S403 of calculating the approximate motion information). In this step, an approximate curve is calculated with respect to a curve being provided in the form of each multi-dimensional coordinate value concerning a plurality of different handwriting motion information items. This approximate curve is used as approximate motion information. More concretely, for example, a mean-square error $\epsilon1$ and a maxim error $\epsilon2$ in the objective curve and its approximate curve are adjusted on the basis of a length of the objective curve and its direction change with respect to the curve of a three dimensional curve being provided in the form of X, Y and Z coordinates concerning tilt information in two directions (x(t), y(t); where t: time) and handwriting vibration information (z(t); where t: time), so as to calculate a quadric B-spline curve, for example. The result is used as approximate motion information. Thus, approximating handwriting motion information reduces the influence of the noise included in handwriting.

Figure 11:
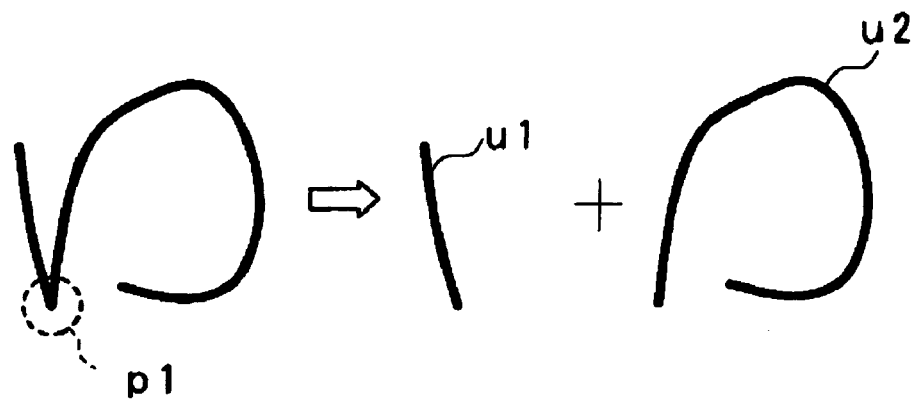
FIG. 11 is a drawing illustrating division into a comparison unit in the method for identifying the handwriting according to the embodiment of the present invention.

Next, calculated approximate motion information is divided to calculate a comparison unit (step 404 of calculating the comparison unit). In the case of suddenly changing the handwriting direction or separating the lead and the writing medium and bringing them back into contact again at the time of handwriting, force operating from the handwriting and the lead is changed significantly. Accordingly, it appears as a singular point (a peak value) in handwriting motion information or approximate motion information. Although comparing with the condition generating the singular point at the time of handwriting is an effective method in the identification, the existence of the singular point making the data value change suddenly often disrupts the estimation in a part other than the singular point. Therefore, in this embodiment, the singular point is extracted so as to compare the singular point itself, and approximate motion information (that is, identification object information) is divided into the comparison unit at the singular point to compare the detail characteristic other than the singular in each comparison unit. In this step S404, a curvature is calculated on approximate motion information, and then, such a point that the absolute value is the lager point than the predetermined threshold of the curvature is determined as the singular point. As a result, this information is stored in the memory 22b. FIG. 11 shows an example of extracting the singular point to divide into the comparison unit with respect to approximate motion information calculated from two pieces of handwriting motion information (such as x and y of tilt information). As shown in this drawing, the large point in the curvature is determined as the singular point p1, and in contrast, the part other than the large point in the curvature is divided into the comparison unit (u1, u2).

Figure 12:
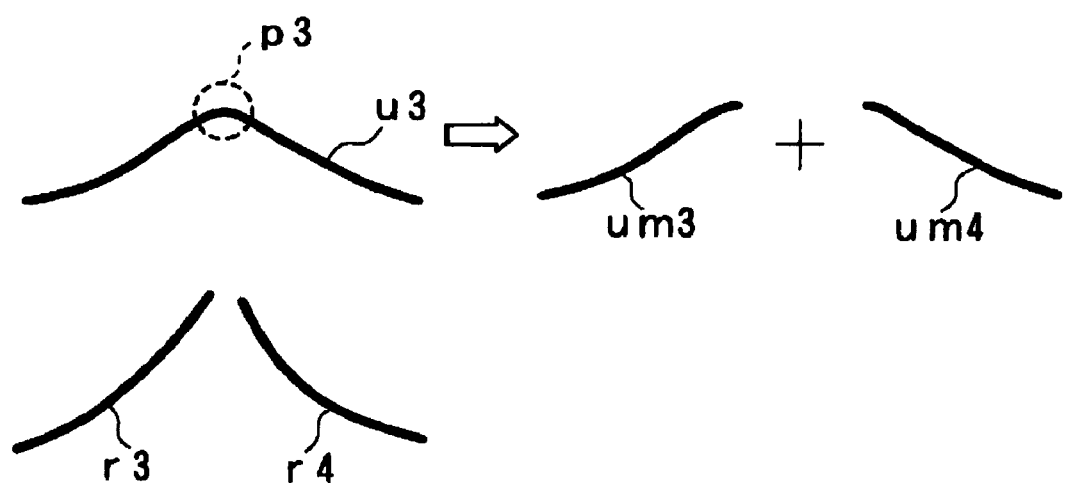
FIG. 12 is a drawing illustrating the modification of the comparison unit in the method for identifying the handwriting according to the embodiment of the present invention.

Next, the calculated comparison unit is compared with the inherent comparison unit stored previously in the storage mechanism 22a to modify the calculated comparison unit (step S405 of modifying the comparison unit). Because nobody can perform exactly the same handwriting motion every time, the singular point near the curvature threshold in the curvature sometimes cannot be determined as the singular point in the above step S404. Therefore, in the step S405, the calculated comparison unit (that is, the data set between neighboring singular points) is compared with the inherent comparison unit stored in storage mechanism 22a to modify the comparison unit. FIG. 12 shows this example. As shown in this drawing, when the length of the comparison unit u3 (namely, the number of included data) is longer than the matching inherent comparison unit (r3, r4), the singular point is considered to be not determined owing to the low curvature. In such a case, the high point (p3) in the curvature in the comparison unit u3 is retrieved. After being divided at the high point in the curvature obtained from retrieval, it is confirmed that the matching of the inherent comparison unit is possible. On the basis of the confirmation, this point p3 is determined as the singular point to redivide the comparison unit (um3, um4).

Next, a comparison item is extracted from approximate motion information (s406). An example of each comparison item will be described below.

<1 The Number of Singular Points, and a Shape>

The difference in the number of singular points is found out by comparing the number of comparison units after the modification described above and that of the previously inherent comparison unit. The number of singular points is the comparison item. The curvature of the singular point is identical to the shape of the singular point and is also used as the comparison item. Further, at this time, the curvature of the singular point can be recalculated from the value of handwriting motion information at the point neighboring the singular point.

<2 The Number of Straight Line Parts and Uneven Parts, and these Directions>

When the straight line part and the uneven part are determined, in the step S406, approximate information in each comparison unit is newly calculated from the handwriting motion information in each comparison unit after modification. In this example, to catch the feature of the shape more accurately, the approximation is carried out in more detail than in the above step S403. For example, the approximation in the step S403 is a quadric B-spline approximation, but, in this step, the errors $\epsilon 1$, $\epsilon 2$ mentioned above are adjusted so as to become smaller than the previous values to approximate to a higher order, such as a cubic B-spline. The curvature of the approximate information in each comparison unit is calculated to determine the uneven parts and the straight line part, respectively, on this curvature. More concretely, the straight line parts are determined when the curvature is larger than the previously stored threshold, and the uneven parts are determined when the part other than the curvature is larger than the previously stored threshold. The comparison unit is scanned from one edge to other edge, and the number of straight line parts and uneven parts can be recognized by comparison of the change in the curvature to the threshold. These are used as the comparison items. A tangential direction of each uneven part and straight line part is calculated from differential calculus of approximate information in each comparison unit. This is used as one of the comparison parts.

Next, with respect to these comparison items (such as the number of singular points, the shape of the singular point (the curvature), the number of straight line parts and uneven parts in each comparison unit, and these directions), the calculated value and each inherent value, which matches each calculated value, stored previously in the data base 22a are completed. In this embodiment, first, a relevance ratio is calculated as the ratio of the calculated value to the inherent value in each item, and then, the maximum value of the relevance ratio in all the items and the mean-squares of all these relevance ratio are calculated. Further, this relevance ratio can be calculated as a weighted mean by previously setting a weight coefficient in each item.

Next, the handwriting identification information is produced on the basis of the result from the comparison identification in the step S407 (step S408 of producing handwriting identification information). Handwriting identification information includes the calculated relevance ratio. Produced handwriting identification information is transmitted to the processing terminal via the communication line 50 by the communication mechanism 23.

Figure 13:
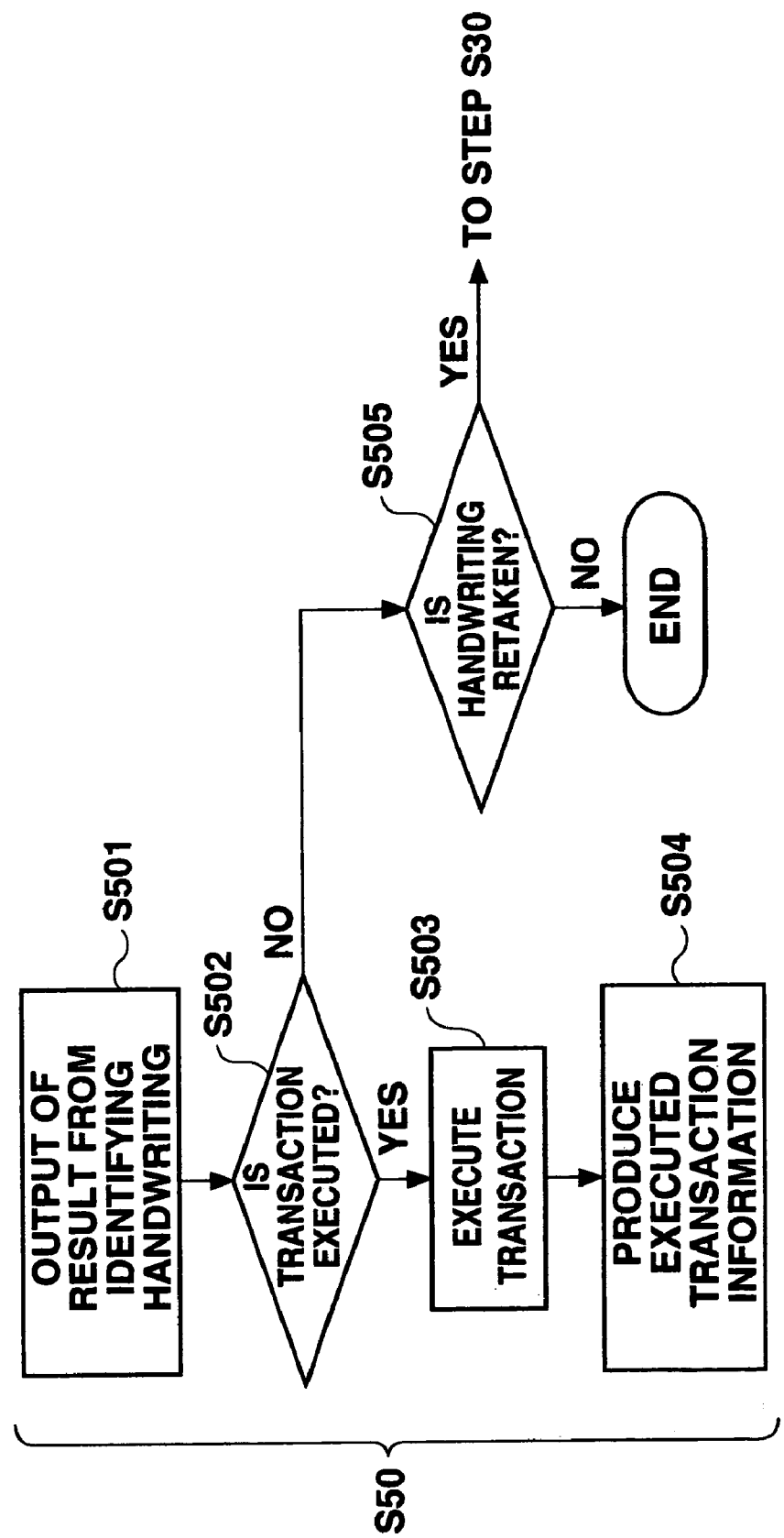
FIG. 13 is a flow chart illustrating the step of executing a transaction in the method for identifying the handwriting according to the embodiment of the present invention.

Next, the step S50 of executing the transaction will be described. FIG. 13 is a flow chart subdividing this step. On receiving handwriting identification information, the processing terminal 10 outputs the result from identifying the handwriting (step S501 of outputting the result from identifying the handwriting). More concretely, the output mechanism 16 such as the display 16a displays the relevant ratio of handwriting motion information and inherent information. Next, for example, an operator judges whether the transaction is to be executed or not (step s502 of judging the execution of the transaction). In the case of judging that it is impossible to execute the transaction, the operator judges, furthermore, whether the writer wishes to be authenticated by carrying out handwriting again (step S505 of judging the re-execution of the handwriting). In this step S505, when the writer applies the handwriting again, the handwriting is performed again to identify the handwriting again. In this case, a command signal for executing the re-execution of handwriting is inputted by the input mechanism 15 such as the keyboard 15a, so that the control mechanism 11 controls each part of the processing terminal 10 for executing the step S30 of producing handwriting information. In contrast, upon judging that the execution of the transaction or the re-execution of handwriting authentication is impossible, the handwriting authentication by the present system is stopped. In this case, the command signal stopping the processing is inputted by the input mechanism 15 such as the keyboard 15a.

In the case of judging that the execution of the transaction is possible, the transaction is executed (step S503 of executing the transaction). In other words, the article is taken over in this embodiment. Furthermore, In this embodiment, as the writing medium 80 consists of the form for the credit card laminated with a transfer sheet, the top sheet subjected to the handwriting such as the signature can remain as a counterfoil kept by the seller, and the second sheet transferred by the handwriting such as the signature can serve as a counterfoil kept by the purchaser Information showing that the transaction has been executed is produced on the basis of the input from the input mechanism 15 (for example, the keyboard 15a) to transmit to the transaction authentication organization 40 and the handwriting identification organization 20 (step S504 of producing the executed transaction information.

Figure 16:
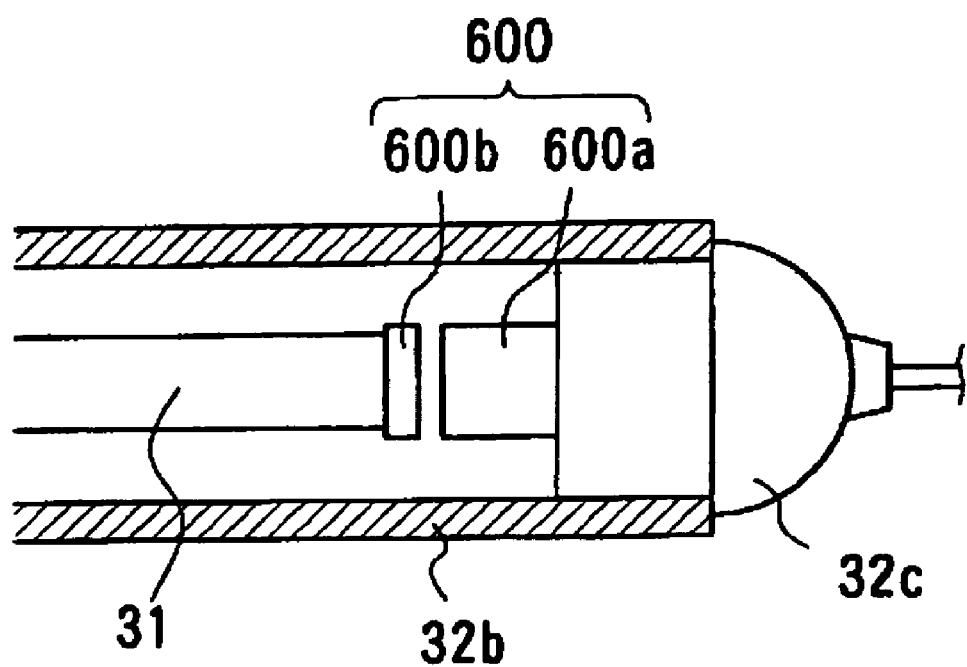
FIG. 16 is a drawing explaining the state of mounting a capacitance tilt change detecting mechanism in the writing implement in the handwriting identification system according to an embodiment of the present invention.
Figure 17:
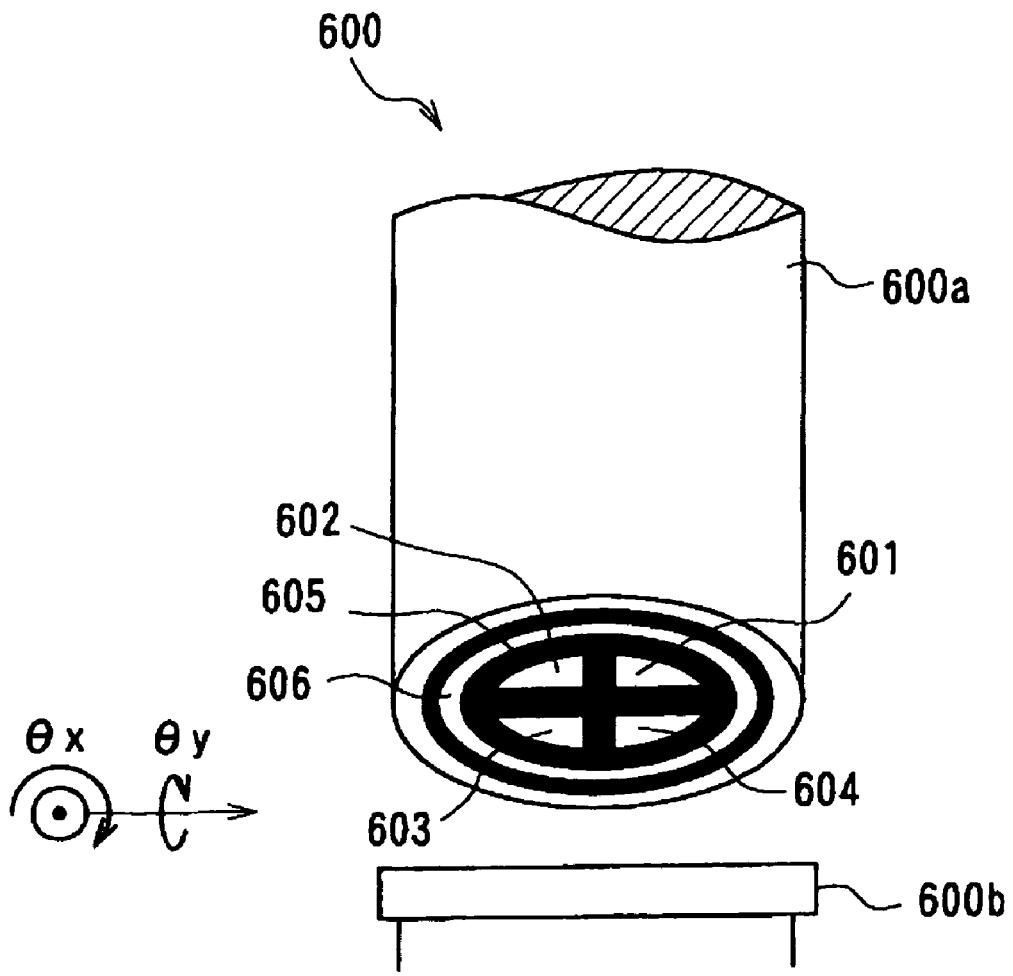
FIG. 17 is a drawing explaining the capacitance tilt change detecting mechanism in the handwriting identification system according to the embodiment of the present invention.

The present invention is not limited to the embodiment mentioned above. The change in the tilt with respect to the writing implement main body 32 of the lead can be detected by the change in the distance between the lead and the writing implement main body. FIG. 16 shows the writing implement mounted with a capacitive tilt change detecting mechanism, and FIG. 17 shows the substantial structure of the sensor in the capacitive tilt change detecting mechanism, respectively.

The capacitive tilt change detecting mechanism 600 has a sensor 600a provided in the end edge 32c of the writing implement, and a target 600b provided in the end edge of the lead 31. The sensor 600a includes sensor electrodes (601, 602, 603, 604), an insulator 605, and a guard ring 606. The sensor 600a provided with a plurality of the sensor electrodes (601~604) in the crossover direction (such as the orthogonal direction) with respect to the axial direction of the lead 31. In the present embodiment, a total of 4 sensor electrodes are located in the shape of a matrix of 2×2 in a plane orthogonal to the axial direction of the lead 31. As the distance between these sensor electrodes (601~604) and the target 600b becomes shorter, the output of the voltage becomes larger, and, in contrast, as the distance therebetween becomes longer, the output of the voltage becomes smaller. This is a so-called capacitance gap sensor. Therefore, by using this feature, the tilt of the target 600b, namely, the tilt of the lead 31 ($\theta x$, $\theta y$) is obtained from the following equations:

$$\theta x = [(V1+V4)-(V2+V3)]/Sx$$

$$\theta y = [(V1+V2)-(V3+V4)]/Sy$$

Where $Vi(i=1\sim4)$: each output voltage of sensor electrodes $$60i(i=1\sim4)$$

Sx, Sy: mean sensitivity to the tilt about the x and y axes

In the above embodiment, though the processing terminal 10, the handwriting identification organization 20 and the transaction authentication organization 40 are constructed separately from each other, these can be configured in a single body, or by another set form of elements. For example, the writing implement can be structured integrally with the vibration actuating mechanism. A vibration element and a detecting element can be made into a detachable unit for mounting the ordinary implement. In the example, the latter can be structured as a detachable unit in a pressure applying part of the lead projected from the end edge of a refilling pencil or a ball point pen.

Though the transaction authentication in the embodiment mentioned above is executed on the basis of information read out from the credit card, this transaction authentication itself can be executed by identifying the handwriting. In this case, the Judgement of the transaction authentication can be executed on the basis of an identification number which is handwritten. Furthermore, in the above embodiment, though the handwriting is identified by compensating handwriting motion information according to attribute information, inherent information according to attribute information is stored previously in the storage mechanism to identify the handwriting in comparison with inherent information. Moreover, in the above embodiment, the operator determines the execution of the transaction on the basis of the outputted result from identifying the handwriting, but the control mechanism can determine automatically on the basis of the result from identifying the handwriting. At this time, the control mechanism can determine in accordance with the relevance ratio, for example. The object of the identification is not only the signature, but also a figure, a mark and so on. Further, it goes without saying that the present invention can apply to any system for identifying handwriting.

Further, a travelling distance of the lead is calculated based upon the change in the tilt, and each item of handwriting motion information is not processed as the function of time but processed as that of the travelling distance of the lead. Handwriting motion information is not limited to the above embodiments.

As described above, according to the present invention, by detecting the change in the tilt to the writing implement of the lead at the time of handwriting and identifying the handwriting based on the detected change in the tilt, the present invention can simplify and miniaturize the structure of the device and, accordingly, has the advantage of achieving improvement in reliability of the authentication.

While there has been described what is at present considered to be a preferred embodiment of the invention, it will be understood that various modifications may be made thereto, and it is intended that the appended claims cover all such modifications as fall within the true sprit and scope of the invention.

What is claimed is:

1. A handwriting identification system for identifying handwriting on the basis of said handwriting, comprising:
   a writing medium;
   a writing implement provided with a lead touching said writing medium, said writing implement including a main body supporting said lead;
   a tilt change detecting mechanism provided with said writing implement main body that detects a change in a tilt of said lead with respect to said writing implement main body;
   a handwriting information producing mechanism that produces handwriting information based on the detected change in the tilt of said lead with respect to said writing implement main body;
   a first storage mechanism that stores inherent information based on a change in a tilt of the lead with respect to the writing implement main body at a time of previous handwriting for at least one writer; and
   a comparison identifying mechanism that identifies the handwriting by comparing the handwriting information produced based on the detected change in the tilt of said lead and the stored inherent information.

2. A handwriting identification system according to claim 1, further comprising:
   a vibrating mechanism that vibrates said lead; and
   a vibration detecting mechanism provided with said lead that detects a change in a vibration of said lead at the time of handwriting;
   wherein said handwriting information producing mechanism further produces handwriting information based on the detected change in the vibration of said lead at the time of handwriting;
   said first storage mechanism stores inherent information based on a change in a vibration of said lead at a time of previous handwriting for at least one writer; and
   said comparison identifying mechanism further identifies handwriting by comparing the detected handwriting information based on the detected change in the vibration of said lead with the stored inherent information based on the stored change in the vibration of said lead.

3. A handwriting identification system according to claim 1, further comprising:
   a second storage mechanism that stores attribute information of said writing implement or said writing medium;
   wherein said comparison identifying mechanism identifies the handwriting in accordance with the attribute information.

4. A handwriting identification system according to claim 3, wherein the attribute information identifies a relative motion characteristic of said lead at the time of handwriting.

5. A handwriting identification system according to claim 3, wherein the attribute information identifies a characteristic influencing a lead motion of said writing medium and/or a sheet at the time of handwriting.

6. A writing implement for identifying handwriting, comprising:
   a writing implement main body;
   a lead supported in said writing implement main body;
   a tilt change detecting mechanism provided with said writing implement main body that detects a change in a tilt of said lead with respect to said writing implement main body,
   wherein said tilt change detecting mechanism detects the change in the tilt of said lead with respect to said writing implement main body on the basis of a change in an arrival position of a wave motion propagating between said lead and said writing main body.

7. A writing implement for identifying handwriting, comprising:
   a writing implement main body;
   a lead supported in said writing implement main body;
   a tilt change detecting mechanism provided with said writing implement main body that detects a change in a tilt of said lead with respect to said writing implement main body,
   wherein said tilt change detecting mechanism detects the change in the tilt of said lead with respect to said writing implement main body in accordance with a change in a distance between a portion of said lead and a portion of said writing implement main body.

8. A method for identifying handwriting on the basis of a change in a motion of a lead touching a writing medium at the time of handwriting, comprising the steps of:

obtaining handwriting motion information according to a detected writing motion, the handwriting motion information including a change in a tilt of a lead with respect to a writing implement main body;

calculating approximate motion information with the handwriting motion information in accordance with a predetermined rule; and identifying the handwriting by comparing the calculated approximate motion information with previously stored inherent information.

9. A method for identifying handwriting according to claim 8, further comprising the step of:

calculating a comparison unit divided from the calculated approximate motion information;

wherein the comparison is made for each comparison unit in said identifying step.

10. A method for identifying handwriting according to claim 9, further comprising the step of:

modifying the calculated comparison unit when comparing the calculated comparison unit with the previously stored inherent comparison unit;

wherein the comparison is made for each modified comparison unit in said identifying step.

11. A method for identifying handwriting according to claim 8, further comprising the step of:

obtaining, as handwriting motion information, the change in a tilt or a vibration of the lead with respect to a writing implement.

12. A method for identifying handwriting according to claim 8, wherein the approximation is a B-spline approximation.

13. A method for identifying handwriting according to claim 8, wherein said step of obtaining handwriting motion information includes obtaining handwriting motion information according to a detected writing motion as the detected writing motion changes.

* * * * *